United States Patent
Haddadin

(10) Patent No.: US 10,843,344 B2
(45) Date of Patent: Nov. 24, 2020

(54) ROBOT SYSTEM

(71) Applicant: Sami Haddadin, Hannover (DE)

(72) Inventor: Sami Haddadin, Hannover (DE)

(*) Notice: Subject to any disclaimer, the term of this patent is extended or adjusted under 35 U.S.C. 154(b) by 44 days.

(21) Appl. No.: 15/766,083

(22) PCT Filed: Oct. 10, 2016

(86) PCT No.: PCT/EP2016/074251
§ 371 (c)(1),
(2) Date: Aug. 8, 2018

(87) PCT Pub. No.: WO2017/060539
PCT Pub. Date: Apr. 13, 2017

(65) Prior Publication Data
US 2018/0345505 A1    Dec. 6, 2018

(30) Foreign Application Priority Data

Oct. 8, 2015    (DE) .................. 10 2015 012 962

(51) Int. Cl.
*B25J 13/06*    (2006.01)
*B25J 9/00*    (2006.01)
(Continued)

(52) U.S. Cl.
CPC ............. *B25J 13/06* (2013.01); *B25J 9/0081* (2013.01); *B25J 9/1656* (2013.01); *B25J 13/025* (2013.01);
(Continued)

(58) Field of Classification Search
None
See application file for complete search history.

(56) References Cited

U.S. PATENT DOCUMENTS

| 4,025,838 A | 5/1977 | Watanabe |
| 4,398,110 A | 8/1983 | Flinchbaugh et al. |

(Continued)

FOREIGN PATENT DOCUMENTS

| AT | 509927 A2 | 12/2011 |
| CA | 2940490 A1 | 9/2015 |

(Continued)

OTHER PUBLICATIONS

PCT/EP2016/069339, Oct. 17, 2016, International Search Report and Written Opinion.

(Continued)

*Primary Examiner* — Bhavesh V Amin
(74) *Attorney, Agent, or Firm* — Wolf, Greenfield & Sacks, P.C.

(57) ABSTRACT

The invention relates to a robotic system with at least one robotic arm and a control unit, which is designed so that it can preset at least one predefined operation that can be carried out by the robotic system. In addition, the robotic system comprises at least one input device attached to the robotic arm which is designed so that the predefined operations of the robotic system can be parameterized by means of the input device. In this case, the input device is designed so that it can provide a user-directed feedback to a user of the robotic system when setting the execution of operations, the logical sequence of the operations and/or parameterizing the predefined operations for the robotic system.

21 Claims, 3 Drawing Sheets

Figure 1:
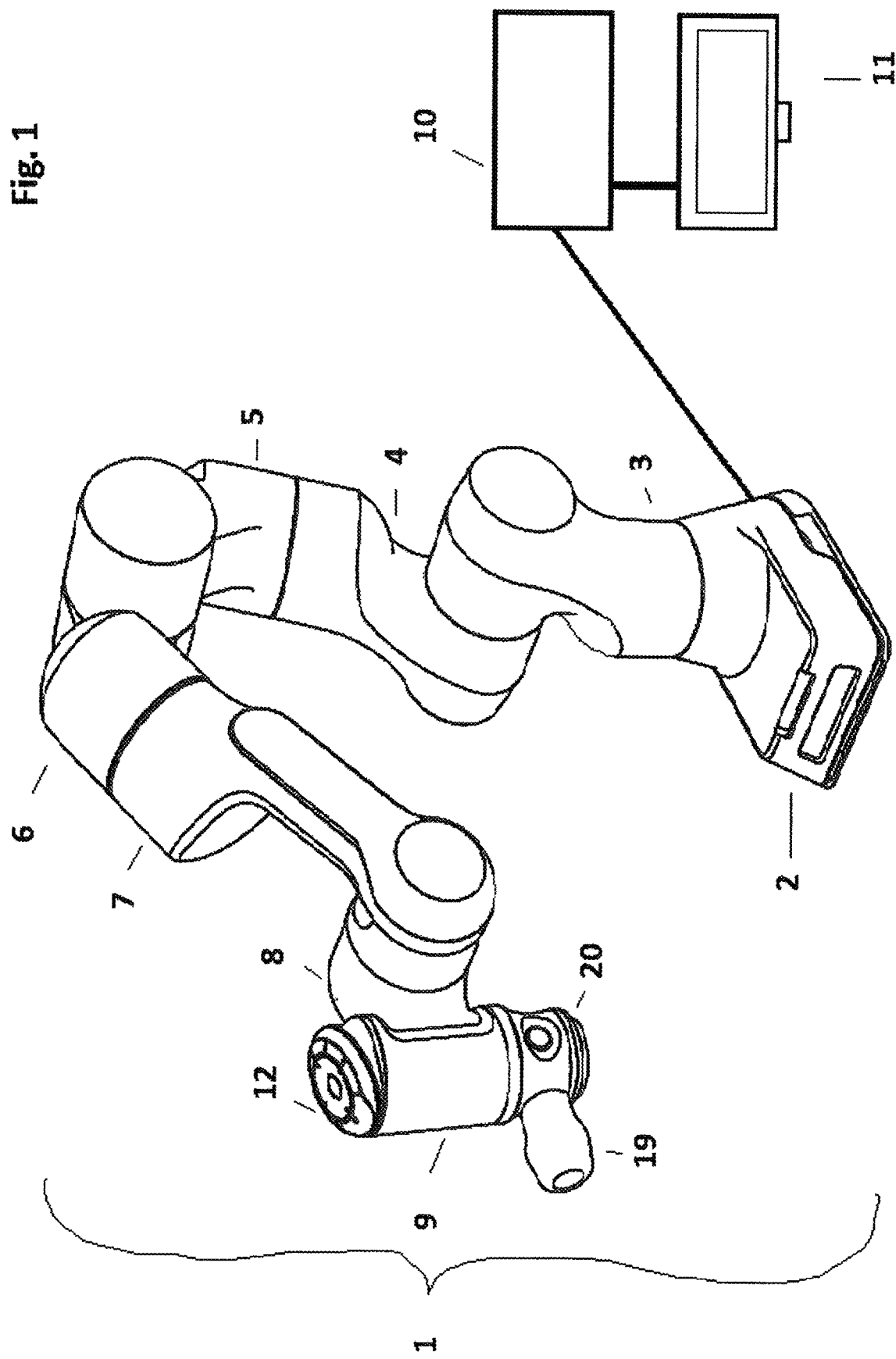

(51) Int. Cl.
*B25J 9/16* (2006.01)
*G05B 19/409* (2006.01)
*B25J 13/02* (2006.01)
*G05B 19/425* (2006.01)

(52) U.S. Cl.
CPC .......... *B25J 13/065* (2013.01); *G05B 19/409* (2013.01); *G05B 19/425* (2013.01); *G05B 2219/36162* (2013.01); *G05B 2219/39427* (2013.01); *G05B 2219/40099* (2013.01); *G05B 2219/40392* (2013.01); *G05B 2219/40395* (2013.01); *G05B 2219/40397* (2013.01)

(56) References Cited

U.S. PATENT DOCUMENTS

| | | | |
|---|---|---|---|
| 4,591,198 A | 5/1986 | Monforte et al. | |
| 4,659,971 A | 4/1987 | Suzuki et al. | |
| 4,678,952 A | 7/1987 | Peterson et al. | |
| 4,804,304 A | 2/1989 | Tellden et al. | |
| 5,040,338 A | 8/1991 | Schwaer et al. | |
| 5,125,149 A | 6/1992 | Inaba et al. | |
| 5,360,249 A | 11/1994 | Monforte et al. | |
| 6,246,479 B1 * | 6/2001 | Jung | G01J 3/02 250/226 |
| 6,422,441 B1 | 7/2002 | Settelmayer et al. | |
| 6,463,360 B1 | 10/2002 | Terada et al. | |
| 8,059,088 B2 * | 11/2011 | Eid | G06F 3/016 345/156 |
| 8,226,140 B1 | 7/2012 | Dietrich et al. | |
| 8,423,189 B2 | 4/2013 | Nakanishi et al. | |
| 8,918,215 B2 * | 12/2014 | Bosscher | G05B 19/427 700/245 |
| 8,997,599 B2 | 4/2015 | Maisonnier et al. | |
| 10,279,478 B2 * | 5/2019 | Akan | G06F 3/048 |
| 2001/0038453 A1 * | 11/2001 | Jung | G01J 3/02 356/419 |
| 2001/0045808 A1 | 11/2001 | Hietmann et al. | |
| 2005/0093821 A1 * | 5/2005 | Massie | G06F 1/206 345/161 |
| 2005/0285854 A1 * | 12/2005 | Morita | G06F 3/016 345/419 |
| 2006/0091842 A1 | 5/2006 | Nishiyama et al. | |
| 2006/0259195 A1 * | 11/2006 | Eliuk | A61J 1/20 700/245 |
| 2007/0057913 A1 * | 3/2007 | Eid | G06F 3/016 345/156 |
| 2008/0016979 A1 | 1/2008 | Yasumura et al. | |
| 2008/0252311 A1 * | 10/2008 | Koh | G01R 31/2806 324/754.08 |
| 2009/0314120 A1 | 12/2009 | Larsson et al. | |
| 2010/0045808 A1 | 2/2010 | Matsusaka et al. | |
| 2010/0073150 A1 * | 3/2010 | Olson | A61B 34/30 340/407.1 |
| 2010/0198394 A1 | 8/2010 | Trygg | |
| 2010/0212133 A1 * | 8/2010 | Montesanti | B23P 19/04 29/281.5 |
| 2010/0262288 A1 * | 10/2010 | Svensson | B25J 9/1671 700/254 |
| 2010/0314895 A1 | 12/2010 | Rizk et al. | |
| 2011/0190932 A1 | 8/2011 | Tsusaka et al. | |
| 2012/0185099 A1 * | 7/2012 | Bosscher | B25J 9/1689 700/264 |
| 2012/0217129 A1 | 8/2012 | Tsutsumi et al. | |
| 2013/0151010 A1 | 6/2013 | Kubota et al. | |
| 2013/0255426 A1 * | 10/2013 | Kassow | B25J 19/0004 74/490.03 |
| 2013/0273818 A1 | 10/2013 | Guan et al. | |
| 2014/0047940 A1 | 2/2014 | Yamamoto | |
| 2014/0183979 A1 * | 7/2014 | Pelrine | H02K 41/03 310/12.05 |
| 2014/0252668 A1 * | 9/2014 | Austin | B28B 3/20 264/40.7 |
| 2015/0053040 A1 | 2/2015 | Ueda et al. | |
| 2015/0122070 A1 | 5/2015 | Yamaguchi | |
| 2015/0364353 A1 | 12/2015 | Sugizaki et al. | |
| 2017/0252920 A1 | 9/2017 | Motomura et al. | |
| 2017/0320211 A1 * | 11/2017 | Akan | G06F 3/048 |
| 2018/0186017 A1 | 7/2018 | Xiong et al. | |
| 2018/0207795 A1 | 7/2018 | Haddadin et al. | |
| 2018/0345505 A1 * | 12/2018 | Haddadin | B25J 9/0081 |
| 2018/0354141 A1 | 12/2018 | Haddadin | |
| 2018/0361594 A1 | 12/2018 | Haddadin | |
| 2019/0054634 A1 | 2/2019 | Haddadin | |
| 2019/0099879 A1 | 4/2019 | Haddadin | |
| 2019/0099881 A1 | 4/2019 | Niu | |
| 2019/0099903 A1 | 4/2019 | Goto | |
| 2019/0126465 A1 | 5/2019 | Haddadin | |
| 2019/0126468 A1 | 5/2019 | Haddadin | |
| 2019/0134811 A1 | 5/2019 | Haddadin | |
| 2019/0168383 A1 | 6/2019 | Haddadin | |
| 2019/0315002 A1 | 10/2019 | Haddadin | |
| 2019/0275681 A1 | 11/2019 | Bohme et al. | |

FOREIGN PATENT DOCUMENTS

| | | |
|---|---|---|
| CN | 201437046 U | 4/2010 |
| CN | 102302858 A | 1/2012 |
| CN | 102410342 A | 4/2012 |
| CN | 104802156 A | 7/2015 |
| DE | 296 09 018 U1 | 8/1996 |
| DE | 197 31 656 C1 | 1/1999 |
| DE | 199 56 176 A1 | 10/2001 |
| DE | 699 21 721 T2 | 11/2005 |
| DE | 10 2005 054575 B3 | 4/2007 |
| DE | 10 2008 062622 A1 | 6/2010 |
| DE | 10 2009 039104 A1 | 3/2011 |
| DE | 10 2010 063 222 A1 | 6/2012 |
| DE | 10 2013 013679 A1 | 2/2014 |
| DE | 10 2013 109753 A1 | 3/2014 |
| DE | 10 2014 216514 B3 | 9/2015 |
| DE | 10 2016 004788 A1 | 10/2017 |
| EP | 441397 A1 | 8/1991 |
| EP | 1435737 A1 | 7/2004 |
| EP | 1880809 A1 | 1/2008 |
| EP | 2129498 A1 | 12/2009 |
| EP | 2131257 A1 | 12/2009 |
| EP | 2548706 A1 | 1/2013 |
| EP | 2784612 A2 | 10/2014 |
| EP | 2851162 A2 | 3/2015 |
| EP | 2864085 A2 | 4/2015 |
| EP | 2868439 A1 | 5/2015 |
| JP | S60 123288 A | 7/1985 |
| JP | S61 252084 A | 10/1986 |
| JP | S62 87153 A | 4/1987 |
| JP | H08281580 A | 10/1996 |
| JP | 2000-218584 A | 8/2000 |
| JP | 2008-23642 A | 2/2008 |
| KR | 2014-0011973 A | 1/2014 |
| WO | WO 2007/082954 A1 | 7/2007 |
| WO | WO 2007/099511 A2 | 9/2007 |
| WO | WO 2009/124904 A1 | 10/2009 |
| WO | WO 2010/088959 A1 | 8/2010 |
| WO | WO 2011/107143 A1 | 9/2011 |
| WO | WO 2014/162161 A1 | 10/2014 |
| WO | WO 2014/170355 A1 | 10/2014 |
| WO | WO 2015/113757 A1 | 8/2015 |

OTHER PUBLICATIONS

PCT/EP2016/069339, Feb. 20, 2018, International Preliminary Report on Patentability.
PCT/EP2016/074250, Jan. 30, 2017, International Search Report and Written Opinion.
PCT/EP2016/074251, Feb. 2, 2017, International Search Report and Written Opinion.
PCT/EP2016/074252, Feb. 2, 2017, International Search Report and Written Opinion.
U.S. Appl. No. 15/752,574, filed Feb. 13, 2018, Haddadin et al.
U.S. Appl. No. 15/766,080, filed Apr. 5, 2018, Haddadin.
U.S. Appl. No. 15/766,094, filed Apr. 5, 2018, Haddadin.

(56) References Cited

OTHER PUBLICATIONS

U.S. Appl. No. 16/077,705, filed Aug. 13, 2018, Haddadin.
U.S. Appl. No. 16/083,192, filed Sep. 7, 2018, Haddadin.
U.S. Appl. No. 16/095,326, filed Oct. 19, 2018, Haddadin.
U.S. Appl. No. 16/095,332, filed Oct. 19, 2018, Haddadin et al.
U.S. Appl. No. 16/095,336, filed Oct. 19, 2018, Haddadin.
U.S. Appl. No. 16/095,622, filed Oct. 22, 2018, Haddadin.
U.S. Appl. No. 16/095,624, filed Oct. 22, 2018, Haddadin et al.
U.S. Appl. No. 16/340,916, filed Apr. 10, 2019, Bohme et al.
PCT/EP2017/059448, Aug. 1, 2017, International Search Report and Written Opinion.
PCT/EP2017/059448, Oct. 23, 2018, International Preliminary Report on Patentability.
PCT/EP2017/059446, Jul. 19, 2017, International Search Report and Written Opinion.
PCT/EP2017/059446, Oct. 23, 2018, International Preliminary Report on Patentability.
PCT/EP2017/059572, Jul. 27, 2017, International Search Report and Written Opinion.
PCT/EP2017/059572, Oct. 30, 2018, International Preliminary Report on Patentability.
International Search Report and Written Opinion for Application No. PCT/EP2017/059448 dated Aug. 1, 2017.
International Preliminary Report on Patentability for Application No. PCT/EP2017/059448 dated Oct. 23, 2018.
International Search Report and Written Opinion for Application No. PCT/EP2017/059446 dated Jul. 19, 2017.
International Preliminary Report on Patentability for Application No. PCT/EP2017/059446 dated Oct. 23, 2018.
International Search Report and Written Opinion for Application No. PCT/EP2017/059572 dated Jul. 27, 2017.
International Preliminary Report on Patentability for Application No. PCT/EP2017/059572 dated Oct. 30, 2018.
[No Author Listed], "Advanced Automation for Space Missions," NASA Conference Publication 2255, Aug. 29, 1980, pp. 1-335. Retrieved from https://ntrs/nasa/gov/archive/nasa/casi.ntrs.nasa.gov/19830007077.pdf on Jul. 7, 2017.
[No Author Listed], "FANUC," YouTube, Dec. 22, 2007. Retrieved from https://www.youtube.com/watch?v=-SREct28IJM on Jul. 11, 2017. Supplemented by five .PNGimages taken from video.
[No Author Listed], CNC Products and Services. Brochure. FANUC America Corporation. 2017. Retrieved Jan. 24, 2019 from https://www.fanucamerica.com/docs/default-source/cnc-files/brochures/cnc-products-and-services.pdf?sfvrsn=865fc162_4.
Sakakibara, A two-armed intelligent robot assembles mini robots automatically. Industrial Electronics, Control, and Instrumentation. Proceedings of the 1996 IEEE IECON 22nd International Conference on Taipaei, Taiwan. 1996;3(5):1879-1883.
Schafer et al., Light-Weight Mechatronics and Sensorics for Robotic Exploration: a DLR Perspective. Feb. 25, 2008. Retrived from http://elib.dlr.de/55362/1/i-sairas2008_Schafer.pdf on Mar. 24, 2017.
CN 102302858 is understood by its English-language machine translation and figures.
CN 102410342 is understood by its English-language machine translation and figures.
CN 104802156 is understood by its English-language machine translation and figures.
DE 199 56 176 is understood by its English-language machine translation and figures.
DE 699 21 721 is understood by its English-language abstract and figures.
DE 10 2005 054575 is understood by its English-language abstract and figures.
DE 10 2008 062622 is understood by its English-language abstract and figures.
DE 10 2010 063222 is understood by its English-language abstract and figures.
DE 10 2013 013679 is understood by its English-language abstract and figures.
DE 10 2013 109753 is understood by its English-language abstract and figures.
DE 10 2014 216514 is understood by its English-language machine translation and figures.
EP 2131257 is understood by its English-language abstract and figures.
EP 2851162 is understood by its English-language abstract and figures.
JP H08281580 is understood by its English-language abstract and figures.
JP 2008-23642 is understood by its English-language machine translation and figures.
WO 2009/124904 is understood by its English-language abstract and figures.
WO 2015/113757 is understood by its English-language abstract and figures.

* cited by examiner

ROBOT SYSTEM

RELATED APPLICATIONS

This application is a national stage filing under 35 U.S.C. § 371 of International Patent Application Serial No. PCT/EP2016/074251, filed Oct. 10, 2016, entitled "Robot System," which claims priority to German application serial number 10 2015 012 962.7, filed Oct. 8, 2015. The entire contents of these applications are incorporated herein by reference in their entirety.

The invention relates to a robotic system with at least one robotic arm, at the end of which, for the operation of the robotic system, an effector may be mounted, which e.g. can consist of a tool.

Robots have now become established in many areas of industry and are e.g. used in the automotive industry for mounting, gluing, screwing, cutting, welding, painting or lifting heavy objects.

In order to teach a robotic system the desired operations, the robotic system must be programmed. This can be done with an on-line or off-line method, whereby in the off-line method the robot program is created without using the robot.

In on-line programming, the robot is needed for programming, which e.g. is the case with direct teach-in programming. Here, the individual points of the desired trajectories are approached by directly guiding the effector by an operator and the respective position of the effector, e.g. of a gripping tool, is determined via the internal encoders and stored. After the geometry of the trajectory has been programmed in this way, the trajectory program can be supplemented with additional instructions entered via an external handheld programming user device.

The previous methods of the described on-line programming are time consuming and uncomfortable for the operator.

It is therefore an object of the present invention to provide a robotic system in which the programming of the robotic system can be performed faster and easier as compared to previous systems.

This object is achieved by a robotic system as indicated in claim 1.

Advantageous embodiments of the invention are specified in the dependent claims.

Figure 2:
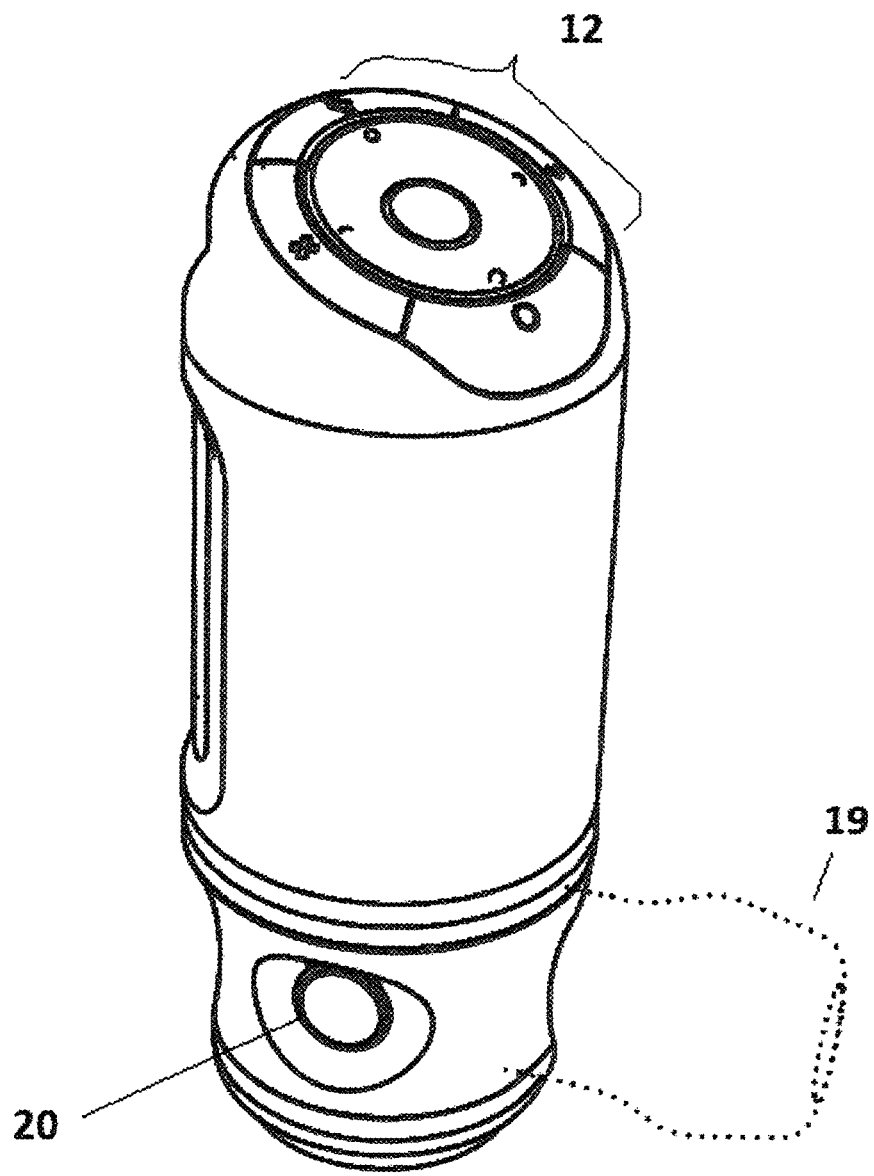
Figure 3:
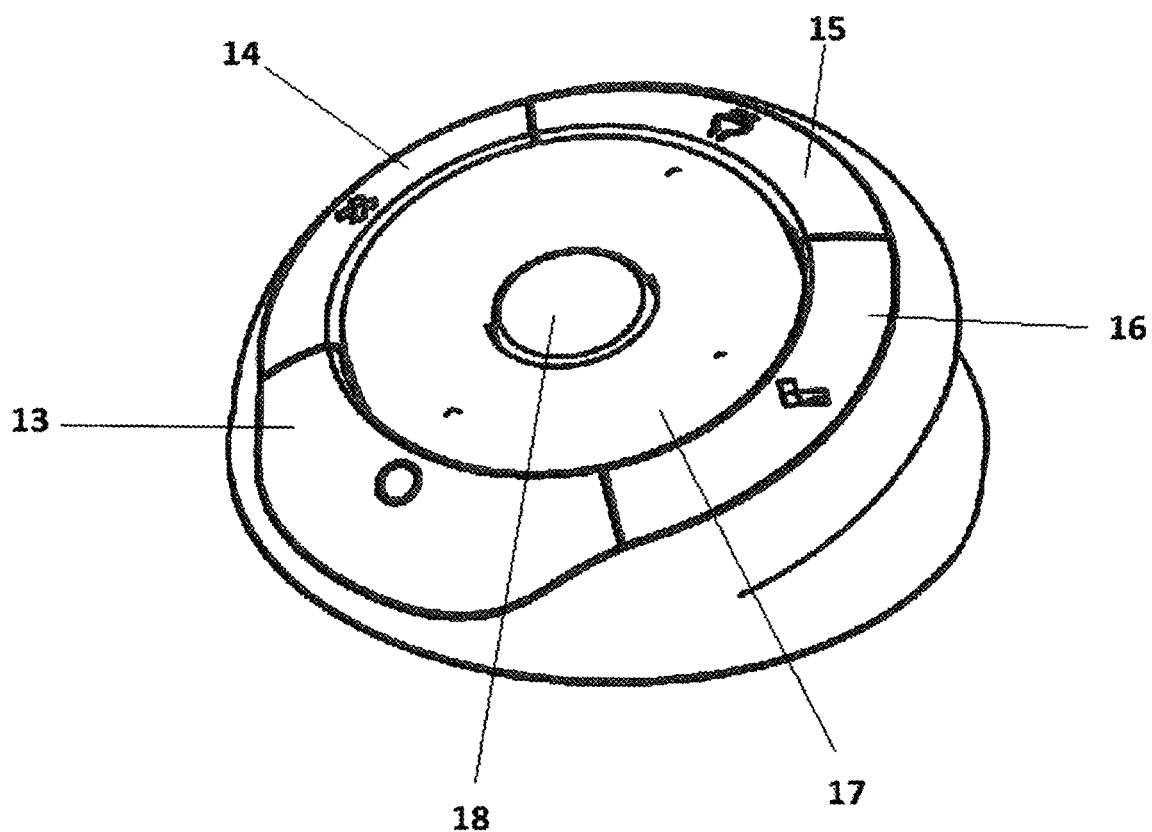

Embodiments of the invention will be explained with reference to the accompanying drawings, in which FIG. 1 shows a robot according to an embodiment of the robotic system according to the invention;

FIG. 2 shows a distal robotic arm member of the robotic arm of the robot system according to the invention, called as pilot head, which is used in connection with an embodiment of the robotic system according to the invention; and FIG. 3 shows a part of an input device which is used in connection with a preferred embodiment of the robotic system according to the invention.

FIG. 1 shows a robotic system according to the invention comprising a robot 1 which stands on a robot basis 2 which carries a robotic arm (or manipulator) which consists of seven robotic arm members 3, 4, 5, 6, 7, 8 and 9 which are linked by means of motion axes (joints). The last (distal) robotic arm member 9, which is also referred to hereinafter as a pilot head, is designed so that in the lower part of the pilot head (not shown in FIG. 1) an effector can be attached thereto, which effector can cause any interaction of the robot with the environment.

Effectors used in connection with the robotic system according to the invention may e.g. be tools for workpiece machining, e.g. a drill, gripper systems for handling and manipulating objects, measuring equipment for carrying out test jobs or cameras, with which the robot can perform observations.

The robot 1 is connected to a computer 10, which takes over the control of the robot 1 and is connected to a display device 11, on which a graphical user interface for programming the robot can be displayed and which, e.g. can consist of a computer screen or the screen of a laptop. The computer 10 is hereinafter also referred to as a control unit.

The pilot head 9 of the robotic system, which is shown in FIG. 2 in a larger dimension, comprises in the upper part a key panel 12, which is also shown in a larger dimension in FIG. 3. The key panel as shown in FIG. 3 has four operating keys 13, 14, 15 and 16 in the form of short-stroke keys, which can be defined or occupied with various functions which must often be called up by the operator in the course of programming and/or parameterizing the robotic system, e.g. delete, save or set, and which are marked with appropriate symbols.

The four operating keys 13, 14, 15 and 16 encircle a D-pad short-stroke key 17, which can be tilted up, down, left and right, e.g. to control a cursor or a selection in a menu displayed on the graphical user interface of the display device in the directions up, down, left and right. In summary, the keys of the key panel 12 attached to the robotic arm and the key 20 constitute an input device.

Instead of a D-pad short-stroke key, other direction keys can also be used for cursor control, e.g. four mutually isolated keys for each of the directions up, down, left and right.

In the center of the D-pad short-stroke key 17, a transparent luminous surface 18 is arranged, which can be illuminated by lighting elements, e.g. one or more LEDs that can be activated by the control unit, in one color or different colors.

In addition, in the lower part of the pilot head 9, a handle 19 is attached, with which the pilot head can be easily guided by an operator of the robotic system.

Further, located in the lower part of the pilot head 9, another button or key 20 is provided, which is mounted on the pilot head such that it can be operated by the operator of the robotic system with the same hand, which hand guides the pilot head 9 or the handle 19 of the pilot head 9 and thus the robotic arm.

The control unit 10, which comprises hardware and software, is designed such that it can specify at least one predefined operation which can be carried out by the robotic system, wherein this operation includes the corresponding control commands with which the axes and the drive of the robot are regulated and the sensors (not shown in FIG. 1) of the robot are controlled.

Preferably, a plurality of predefined operations and the associated commands are stored in the control unit. These predefined operations could include, e.g. picking up objects, placing objects, inserting objects, screwing in objects, drilling, surface finishing or button/key actuating.

In the control unit the predefined operations are assigned to icons that can be presented on a graphical user interface, which can be displayed on the display device by means of the control unit.

In a preferred embodiment of the robotic system according to the invention, the operator can use the keys 13, 14, 15, 16 and 17 of the input device to select the desired operations, that the robotic system should perform to accomplish a given task, from a menu displayed on the graphical user interface, in that the operator moves e.g. by means of the D-pad short-stroke key, in the menu to the corresponding operation icon and then, after having selected this icon, confirming this icon by pressing one of the four operating keys 13, 14, 15 and 16, which keys have been previously set with a corresponding function.

In an alternative embodiment, key 20 may also be used to confirm an operation previously selected by means of the D-pad stroke key.

In a further embodiment, the robotic system according to the invention can also be designed in such a way that the control unit is designed to, for each operation, display in the graphical user interface during the parameterization of an operation a predetermined parameterization submenu (context menu) stored in the control unit, in which submenu the various predetermined parameterization options are shown, which can then be selected with the input device on the pilot head 9 via the keys 13, 14, 15, 16, 17 and/or 20 by means of a control of the graphical user interface of the parameterization submenu in order to perform a parameterization.

With such a parameterization, e.g. parameters such as the coordinates of points to be approached by the effector, torques, forces, accelerations, time durations, number of repetitions or subsequent operations of an operation can be entered by means of the input device.

In a further embodiment, the control unit stores all possible operations of the robotic system and all possible parameterization submenus aimed for these operations, which are structured such that the operator can conduct all programming of the robotic system at the input device with a very limited number of input elements, e.g. keys, so that the programming can be done without the aid of external input devices such as computer keyboards. Ideally, with the pilot head as shown in FIG. 1, this can even be done with only one hand, so that the operator's second hand is free to be used for other functions, e.g. the actuation of an EMERGENCY STOP switch.

The setting of the parameters can also be done by a dialog menu stored in the control unit, wherein the individual parameters are queried individually and one input must be made on the input device via the keys, respectively. Corresponding feedback on the input device can then be provided, which confirms the respective input of the operator (for example by a green light field 18) or can be displayed as faulty (for example by a red light field 18).

The input device attached to the pilot head does not necessarily have to consist of keys, but may e.g. also include a touchpad, a trackball, a joystick or similar device.

In the robotic system according to the invention, the input device is further adapted to provide a user-directed feedback to an operator of the robotic system while setting the sequence of operations of the robotic system and/or parameterizing the predefined operations for the robotic system.

Such feedback may be provided e.g. optically, in that static or varying light signals are emitted through the light field 18, which are triggered by the control unit.

In another embodiment, the feedback may be designed such that it can be detected haptically by the operator of the robot system. This can be performed e.g. by vibrating the input device, i.e. the pilot head 9, which is triggered by the control unit, in that a drive belonging to the pilot head is activated, accordingly.

According to a further embodiment, the keypad can also have a plurality of light fields by means of which the optical feedback occurs.

The feedback signals are preferably designed so that they confirm an input of the operator as being positive or negative. For example, in the event of a faulty input by the operator, the illuminated field 18 lights up red, while it lights up green when the input is correct.

In another embodiment, the feedback may also be arranged to represent a request to select a predefined operation of the robotic system from a group of predefined operations or to input a parameter with respect to an operation.

According to a further embodiment, the control unit may be configured such that a certain selection of operations and/or parameters is performed by actuating certain keys and/or specific key combinations on the input device.

Further, according to another embodiment, the control unit of the robotic system may be configured to display a graphical user interface on a display device on which the predefined operation can be displayed, wherein the control unit is further configured to provide feedback to the operator depending on the operation represented on the graphical user interface.

In a further embodiment of the robotic system according to the invention, the feedback can also be effected by an acoustic signal. For this, e.g., a speaker can be mounted directly on the input device, which is controlled by the control unit.

The display device of the robotic system may also consist of a 3D display device, e.g. electronic 3D glasses.

The invention claimed is:

1. Robotic system having at least one robotic arm comprising a plurality of arm members, a control unit configured to specify at least one predefined operation to be performed by the robotic system, and at least one input device attached to the robotic arm configured to parameterize the predefined operations with respect to the robotic system by means of the input device, wherein the input device is attached to an arm member to which an effector can be mounted and is adapted to provide a user-directed feedback to an operator of the robotic system when setting the execution of operations, setting the logical sequence of operations, and/or parameterizing the predefined operations for the robotic system.

2. Robotic system according to claim 1, in which the feedback occurs optically.

3. Robotic system according to claim 2, in which the feedback is effected by static or varying light signals.

4. Robotic system according to claim 1, in which the feedback is designed so that it can be detected haptically by the operator of the robotic system.

5. Robotic system according to claim 4, in which the feedback is provided by a vibration of the input device.

6. Robotic system according to claim 1, in which the input device consists of a multi-key keypad.

7. Robotic system according to claim 6, in which in addition the keypad comprises luminous fields, by means of which the optical feedback takes place.

8. Robotic system according to claim 6, in which the keys of the keypad are adapted to emit light signals.

9. Robotic system according to claim 6, in which the keys comprise color coding associated with a parameterization procedure.

10. Robotic system according to claim 6, in which the keys also include direction keys for two-dimensional control on a graphical user interface.

11. Robotic system according to claim 1, in which the input device consists of a touchpad, a trackball, a touch display, a proximity sensor or a joystick.

12. Robotic system according to claim 1, in which the feedback is configured to positively or negatively acknowledge an operator input, or to provide neutral feedback.

13. Robotic system according to claim 1, in which the feedback is configured to represent a request to select a predefined operation with respect to the robotic system from a group of predefined operations.

14. Robotic system according to claim 1, in which the feedback is configured to represent a request to input a parameter of an operation.

15. Robotic system according to claim 1, in which the parameters acquired in the course of the parameterization comprise parameters derived from the group of parameters, which include coordinates of points to be approached by the effector, torques, forces, accelerations, time durations, number of repetitions or subsequent operations of an operation.

16. Robotic system according to claim 1, in which the feedback is designed so that it represents a fault signal.

17. Robotic system according to claim 1, in which the operations comprise one or more of the operations of the group of operations, which include picking objects, placing objects, inserting objects, screwing objects, drilling, machining surfaces or actuating keys.

18. Robotic system according to claim 1, in which the control unit is configured to select particular operations and/or parameters by actuating certain keys and/or specific key combinations on the input device.

19. Robotic system according to claim 1, in which the input device is configured so that the operator, while guiding the arm member to which the effector can be attached, with his hand, can operate the input device simultaneously with the same hand.

20. Robotic system according to claim 1, in which the input device is axially opposed to the effector.

21. Robotic system according to claim 1, in which the control unit is adapted to display a graphical user interface on a display device on which the predefined operation can be presented, and the control unit is further adapted to provide feedback to the operator depending on the operation as represented on the graphical user interface.

* * * * *